REED RELAY CIRCUIT

Filed Oct. 26, 1962

INVENTORS
Robert K. Else
Louis J. Meyer
BY C. A. Gulbrandsen
Atty.

1

3,160,714

REED RELAY CIRCUIT

Robert K. Else, Oak Park, and Louis J. Meyer, Hinsdale, Ill., assignors to Automatic Electric Laboratories, Inc., Northlake, Ill., a corporation of Delaware Filed Oct. 26, 1962, Ser. No. 233,290
6 Claims. (Cl. 179—18)

This invention generally relates to telephone or like systems such as for example disclosed in copending application Serial No. 240,497, filed November 28, 1962, K. K. Spellnes et al., Communication Switching System, and particularly to ring trip circuits therefor whereby ringing current, for example, sent over a telephone line is tripped.

An object of the invention is to provide a ring trip circuit that uses a reed-type relay for its switching component resulting in a more reliable circuit for telephone systems of the above character.

Another object of the invention is to provide an arrangement for a reed type relay such that the relay will not operate when alternating current is impressed upon its winding but will operate when a direct current circuit is completed for its winding.

Another object of the invention is to provide a relay structure which makes a normally fast operated reed relay slow-to-operate and adaptable for use as a ring trip relay.

Heretofore reed type relays were not used in ring trip circuits due to their inability to operate slow enough. Consequently false tripping would occur when a reed relay was tried. Therefore, it was not possible to construct a telephone switching system, for example, using reed relays exclusively as the switching components.

Moreover heretofore ring trip circuits included normal heelpiece relays with sleeves and armature end slugs to achieve a slow-to-operate characteristic. Although these circuits performed satisfactorily for the most part they were inherently less reliable than circuits using reed type relays. This was attributed to the fact that the contacts of the relays were always exposed to atmospheric contaminants.

Therefore, it is the aim of the preesnt invention to eliminate inherent weaknesses in prior art ring trip circuits and to improve their operation to such an extent that they may be used in high speed telephone switches systems and in switching systems which use reed-type switches exclusively as the switching component.

The preferred embodiment of the invention features a circuit with a three winding reed relay coupled to a 1:1 transformer. The relay structure includes four, for example, encapsulated reed switches which are positioned externally of the relay windings. In addition it includes a pair of L-shaped flux concentrators mounted to the ends of a solid core made from a magnetic iron copper combination.

One of the windings of the relay is connected to the primary winding of the transformer. Another winding is connected to the secondary winding and a third winding is shorted about itself. The first and second windings are wound around the core differentially with respect to each other and connected to the transformer, such that when the primary winding is traversed by A.C. an A.C. potential is impressed upon the secondary winding which causes a current flow in the second winding of the relay of a magnitude substantially equal to that in the first winding. The effect of this is that the corresponding magnetic fields oppose and cancel each other and have no effect upon the reed switches. The third winding is also wound around the core and inductively coupled to the first winding to buck the M.M.F. in the first winding so the relay is slow-to-operate.

When A.C. (ringing current) is sent out over the line

2 or loop circuit the first and second windings become balanced and the relay remains non-operated (reed contacts opened). The M.M.F. in the first winding is opposed by the M.M.F. in the second winding. However, when the called party answers the telephone a D.C. path in addition to the A.C. path is established through the primary winding and the relay. Since the feedback transformer does not recognize the superimposed D.C. a bucking D.C. M.M.F. in the second relay winding does not occur as in the case with A.C. The result is that the relay is no longer balanced and the relay becomes operated. The operation of the ring trip relay shunts out, for example, a pre-operated control relay and disconnects the ring trip circuit from the line.

These and other objects and features of the invention will become more apparent from a further perusal of the following detailed description, taken in conjunction with the accompanying drawings which form a part thereof.

Figure 1:
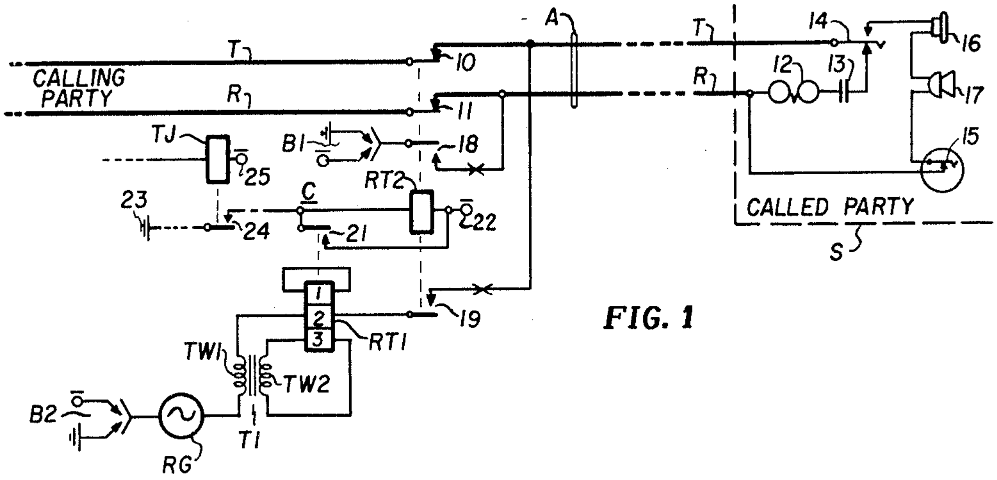
FIG. 1 shows a preferred embodiment of a ring trip circuit according to the invention connected to a telephone line circuit.

Referring now to FIG. 1 of the drawings, there is shown by means of the usual circuit diagrams a loop circuit A, a subscriber's station S, a ringing generator RG, a control circuit C, and a ring trip circuit RTC.

The loop circuit, when a part of a telephone system, extends, for example, from a calling party to a called party of a telephone line hook-up. This hook-up naturally requires the association of preceding switching stages or junctors such as shown in the aforementioned copending application. By way of illustration the line circuit includes two conductors T and R at the end of which are the respective subscribers' stations or telephones. Each includes a ringer 12, a condenser 13, and a D.C. path extending through receiver 16, transmitter 17 and dial 15, for example.

It is to the aforedescribed line circuit A that the ring trip circuit RTC is made accessible. The latter includes the components: ringing generator RG, transformer T and ring trip RT1. The generator may either be former T and ring trip relay RT1. The generator may either be battery connected or ground connected. The coupling means or more specifically the transformer T includes two well balanced windings TW#1 and TW#2 and a lamination cross section sufficient enough to prevent D.C. saturation. Since relay RT1 plays a major part in the operation of the circuit it is deemed in order to provide a detailed description of this relay.

Figures 2, 3:
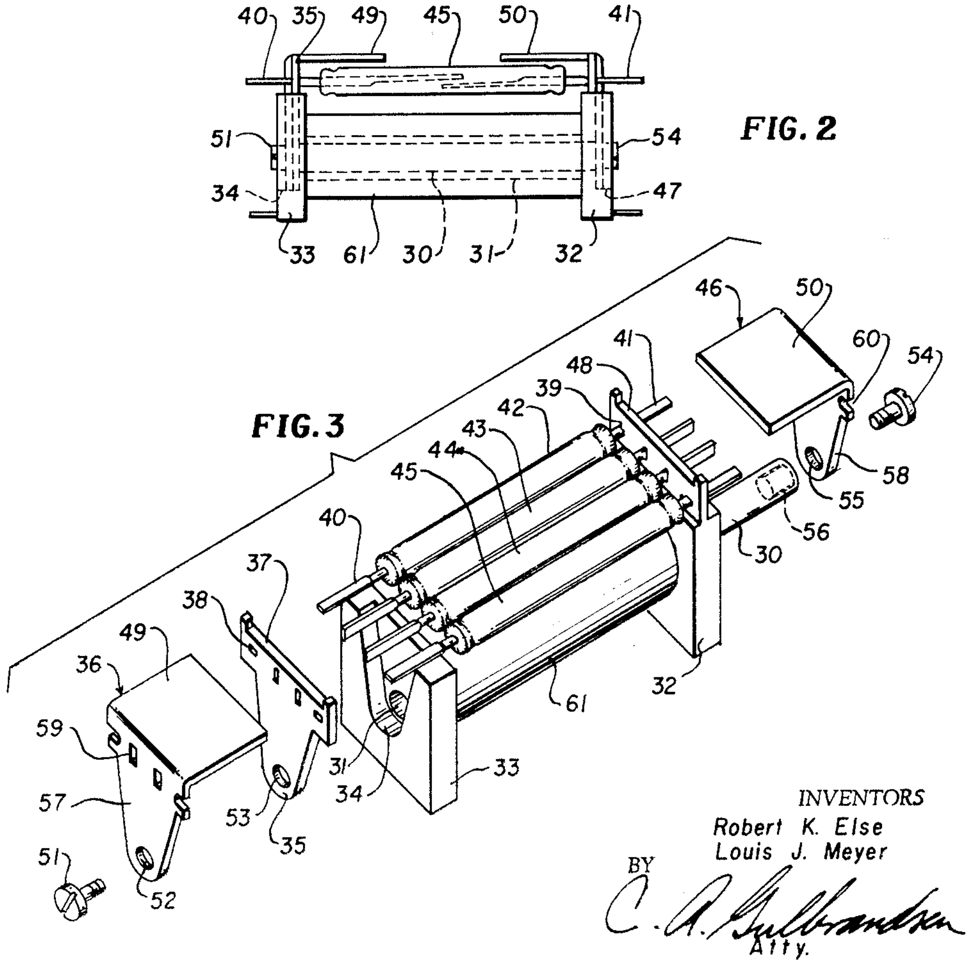
FIG. 2 is a plan view of a slow-to-operate relay used in the circuit shown in FIG. 1.
FIG. 3 is an exploded perspective view of the slow-to-operate relay shown in FIG. 2.

Reference is made to FIGS. 2 and 3 which show relay RT1 in detail. Therein character 30 designates the core or more generally the magnetic return path A in the magnetic circuit. To provide the required slow-to-operate characteristic, core 30 is constructed from a combination of magnetic iron and copper material.

Core 30 is placed in a tubular portion 31 of the relay's bobbin or frame structure. The latter is an integral part preferably made from a plastic material. In addition to the tubular section there are two end flanges 32 and 33. The exterior end surfaces of each include a cavity or recess 34 and 47. These recesses locate flux concentrators 36 and 46, and more specifically fix them into position when helped from corresponding slots 37 and 48 at the top edge of key 35 and flange 32. Key 35 and flange 32 include further apertures 38 and 39 respectively which receive the ends 40 and 41 of the reed switches 42–45.

It is important to note that the flux concentrators are L-shaped with legs 49 and 50 extending toward each other and adjacent the reed switches. The flux concentrators when used in combination with core 30 form an improved core structure for the relay. Furthermore they act as magnetic shields to stray fluxes emanating from possible adjacent components. Each flux concentrator includes apertures designated as 59 and 60 respectively for receiving the ends 40 and 41 of the reed switches. Furthermore, the flux concentrators are assembled by means of a pair of screws 51 and 54. Screw 51 is inserted thru aperture 52 in leg 57, aperture 53 in key 35 and into one of the tapped holes 56 located in the ends of core 30. Screw 54 similarly is inserted through aperture 55 and into tapped hole 56.

The relay furthermore includes coil 61 which preferably includes three windings designated as #1, #2, #3 in FIG. 1. Windings #1 and #3 are wound on the tubular portion 31 in the same direction opposite to that of winding #2. Furthermore winding #1 is shorted and made from a copper material in order to provide a bucking effect to winding #2 and slow up the operation of relay RT1. It should be understood that any copper slug or conductive element can be used in place of the shorted winding. The only requirement imposed as to what element is used is that it must be inductively coupled to relay winding #2.

Windings #2 and #3 have equal turns and equal resistances for ampere-turn balance. Therefore upon receiving A.C. (ringing current) the M.M.F in both winding #2 and winding #3 are equal and balanced resulting in the cancellation of fluxes and non-operation of the relay.

It is only upon superimposing D.C. (exchange battery) on winding #2 that a differential flux condition exists and operates the relay.

Control circuit C represents the means for connecting the ring trip circuit RTC to the line circuit A after the latter is seized by means of relay TJ which is for example part of the preceding switching train (not shown). Control circuit C includes control relay RT2 which is preferably also a reed-type relay, contacts 21, battery 22, ground 23, make contacts 24 and terminating junctor relay 25.

The operation of the ring trip circuit commences once the relay TJ is seized by the preceding switching stages and closes a path to the RT2 relay. This is done through contacts 24 which complete a path from ground to battery through the relay RT2. RT2 when operated pulls up contacts 18 and 19 and opens contacts 10 and 11 in the line circuit A. Thusly is the ring trip circuit RTC connected to the line circuit. Although contacts 10 and 11 are opened now the line to the calling party is actually held up by means (not shown) such as a relay. This closes a path from the battery or ground connected generator RG through the primary winding TW#1 of transformer T1 through the #2 winding of relay RT1, contacts 19, over conductor T of the line circuit, through condenser 13, ringer 14, through contacts 18 to ground or battery. The effect of the completing of this path is that a balanced condition exists in relay RT1 and A.C. current passes through ringer 12 causing it to ring at the subscriber station. This is attributed to the induced current or feedback current in the secondary winding TW#2 of transformer T1 and in the #3 winding of relay RT1. As aforementioned the relay is differentially wound and therefore the flux created by the #3 winding nullifies the flux created in the #2 winding. The result is that the relay reeds do not close.

More generally stated, to operate relay RT1 there must be the superimposing of D.C. on the relay coil. This closes a direct current path extending from battery B2 through winding TW#1 of transformer T1, relay winding #2, closed contacts 19, closed contacts 14, receiver 16, transmitter 17, dial 15, line conductor R closed contacts 18 to ground or battery. Thusly is direct current superimposed on the alternating current carried by winding #2 of relay RT1. This increases the strength of the magnetic field in this winding and has no effect on the #3 winding. Unbalance in the relay results and the reeds thereof close thus operating relay RT1.

Operation of RT1 shunts relay RT2 by means of a path extending from battery at 22 through closed contacts 21, make contacts 24 to ground at 23. With RT2 restored contacts 18 and 19 restore or open and contacts 10 and 11 close disconnecting the ring trip circuit from the line circuit and reconnecting the line circuit.

It should now be understood that the instant invention has provided a novel combination which can be used as a ring trip circuit. Thus for the first time a ring trip circuit has the reliability and dependability which matches that of other reed type switching system circuits.

Moreover, it should be understood that the invention represents an improved means for balancing a differentially wound ring trip relay.

The invention has been described in connection with a preferred embodiment, however, it is to be understood that this was by way of example and should not be considered a limitation to the spirit and scope of the invention as hereinafter claimed.

What is claimed is:

1. In combination: a relay comprising at least one encapsulated reed switch having a pair of reeds with contacts in a normally opened position, a core structure made of magnetic iron material, and a first winding and a second winding wound differentially about said core structure; a circuit including said first winding; a coupling means in said circuit and connected to said second winding so that if said circuit is traversed by alternating current an alternating current potential is impressed on said second winding for setting up in said second winding an alternating field substantially balancing the alternating field in said first mentioned winding; and a conductive element inductively coupled to said first winding to delay the buildup of flux in said core structure sufficiently to prevent said contacts from closing due to any remaining unbalance of said alternating fields, whereby said reed will not close if said circuit is traversed by alternating current only but said contacts will close if it is traversed by direct current.

2. In combination: a relay comprising at least one encapsulated reed switch having a pair of reeds with contacts in a normally opened position, a core structure made of magnetic material comprising a core and a pair of flux concentrators each connected to an end of said core and having a leg thereof extending adjacent said reed switch and toward each other, and a first winding and a second winding wound differentially about said core structure; a circuit including said first winding; a coupling means in said circuit and connected to said second winding so that if said circuit is traversed by alternating current an alternating current potential is impressed on said second winding for setting up in said second winding an alternating field substantially balancing the alternating field in said first mentioned winding; and a conductive element inductively coupled to said first winding to delay the buildup of flux in said core structure sufficiently to prevent said contacts from closing due to any remaining unbalance of said alternating fields, whereby said reeds will not close if said circuit is traversed by alternating current only but said contacts will close if it is traversed by direct current.

3. In combination: a normally operated loop circuit; an alternating current source connected in said loop circuit; a ringer in said loop circuit operated in response to receiving a signal from said alternating current source; a ring cut off relay comprising at least one encapsulated reed switch having a pair of reeds with contacts in a normally opened position, a coil positioned adjacent said reed switch comprising a first winding connected in said loop circuit, a second winding wound differentially with respect to said first winding, and a shorted winding to oppose any current biuldup in said first winding, and a core structure positioned adjacent said reed switch and within said coil to provide a magnetic circuit for said relay; a transformer with a primary winding connected in said loop circuit and a secondary winding connected to said second winding of said relay; means for closing said loop circuit so that the alternating current in said first winding operates said ringer and impresses an alternating current potential on said second winding for setting up in said second winding an alternating field substantially balancing the alternating field in said first winding and prevent said contacts from closing; and a second means for superimposing direct current on said alternating current in said first winding and said primary winding to remove said balance and close said contacts of said cut off relay and open said loop circuit.

4. In combination: a normally opened loop circuit; an alternating current source connected to said loop circuit; a sound producing means in said loop circuit operated in response to receiving a signal from said alternating current source; a sound cut off relay comprising a frame structure having a tubular section with a flange at each end thereof, at least one encapsulated reed switch having a pair of reeds with normally opened contacts supported by said flanges, a coil positioned adjacent said reed switch having a first winding connected in said loop circuit, a second winding wound differentially with respect to said first winding, a core made of magnetic-iron material and placed in said tubular section, and a pair of L-shaped flux concentrators made of magnetic material, each fixed to an end of said core and having a leg thereof extending externally of said reed switch and toward each other; a transformer with a primary winding connected in said loop circuit and a secondary winding connected to said second winding of said relay; means for closing said loop circuit so that the alternating current in said first winding operates said ringer and impresses an alternating current potential on said second winding for setting up in said second winding an alternating field substantially balancing the alternating field in said first winding and prevent said contacts from closing; and a second means for superimposing direct current on said alternating current in said first winding and said primary winding to remove said balance and close said contacts of said cut off relay and open said loop circuit.

5. A combination as claimed in claim 4 wherein said relay furthermore comprises a conductive element means positioned about said tubular section and inductively coupled to said first winding to oppose any current buildup in said first winding.

6. In combination: a normally opened loop circuit; an alternating current source connected in said loop circuit; a normally opened second circuit connected to a direct current source; a sound producing means in said loop circuit operated in response to receiving a signal from said alternating current source; a sound cut off relay comprising a frame structure having a tubular section with a flange at each end thereof, at least one encapsulated reed switch having a pair of reeds with normally opened contacts supported by said flanges, a coil positioned adjacent said reed switch having a first winding connected in said loop circuit and said second circuit, a second winding wound differentially with respect to said first winding, and a shorted winding inductively coupled to said first winding to oppose any current buildup in said first winding, a core made of magnetic-iron material and placed in said tubular section, and a pair of L-shaped flux concentrators made of magnetic material each fixed to an end of said core and having a leg thereof extending externally of said reed switch and toward each other; a transformer with a primary winding connected in said loop circuit and in said second circuit and a secondary winding connected to said second winding of said relay; means for closing said loop circuit so that alternating current in said first winding operates said ringer and impresses an alternating current potential on said second winding for setting up in said second winding an alternating field substantially balancing the alternating field in said first winding and prevent said contacts from closing; and a second means for closing said second circuit to superimpose direct current on said alternating current in said first winding and said primary winding to remove said balance and close said contacts of said cut off relay and open said loop circuit.

References Cited in the file of this patent

UNITED STATES PATENTS

| | | |
|---|---|---|
| 2,983,792 | Nitsch | May 9, 1961 |
| 3,005,877 | Nitsch | Oct. 24, 1961 |
| 3,033,939 | Nitsch | May 8, 1962 |
| 3,037,085 | Lowry | May 29, 1962 |
| 3,053,938 | Nitsch | Sept. 11, 1962 |